United States Patent
Barron et al.

[15] 3,680,126
[45] July 25, 1972

[54] SELF-PROGRAMMING ANTENNA TRACKING SYSTEM

[72] Inventors: Roger L. Barron, Burke; Kenneth S. Kelleher, Alexandria; George C. Vieth, Jr., Springfield, all of Va.

[73] Assignee: Adaptronics, Inc., McLean, Va.

[22] Filed: Aug. 18, 1969

[21] Appl. No.: 850,996

[52] U.S. Cl. ....................................343/117 R, 235/150.1
[51] Int. Cl. ..........................................................G01s 3/42
[58] Field of Search ....................343/117, 895; 235/150.1

[56] References Cited

UNITED STATES PATENTS

| | | | |
|---|---|---|---|
| 2,724,115 | 11/1955 | Stewart | 343/117 R |
| 3,283,332 | 11/1966 | Nussbaum | 343/895 |
| 3,460,096 | 8/1969 | Barron | 235/150.1 X |

Primary Examiner—Rodney D. Bennett, Jr.
Assistant Examiner—Richard E. Berger
Attorney—Jay M. Cantor

[57] ABSTRACT

The disclosure relates to a self-programming antenna tracking system having a single channel between the antenna system and the control system, the antenna system being capable of providing a single output signal which is indicative of tracking error and the control system comprising a self-organizing controller capable of providing multiple actuator control signals to multiple actuators to minimize tracking error based upon evaluation of the single error signal provided along the single channel.

10 Claims, 5 Drawing Figures

INVENTORS
ROGER L. BARRON
KENNETH S. KELLEHER
GEORGE C. VIETH, JR.

INVENTORS
ROGER L. BARRON
KENNETH S. KELLEHER
GEORGE. C. VIETH, JR.

SELF-PROGRAMMING ANTENNA TRACKING SYSTEM

This invention relates to a self-programming antenna tracking system and, more particularly, to an antenna tracking system utilizing a single channel and a single error signal transmitted thereon from the antenna to a controller to provide proper antenna control and tracking.

Prior art antenna tracking systems have fallen mainly into two classes, one being time sharing of a plurality of antenna beams such as four antenna beams using up and down elements and left and right elements. The second well known system is that of monopulse wherein information is received from a single pulse. The prior art monopulse systems have required three receiver channels to preserve the polarity of the RF for determining signal direction. The prior art time sharing system requires one channel multiplexed to provide an overall summation, an up-down difference and a left-right difference. This system displays a four fold decrease in the information rate due to sequential lobing. It also suffers from the problems inherent in switching from receiver to receiver, has high loss from the noise, and has a beam control problem due to mutual coupling. This system also has severe frequency range limitation because its calibration curve is a sensitive function of received frequency. Finally, this system must have accurate phase and amplitude balance in the three channels for accurate resolution.

In accordance with the present invention, there is provided a self-programming antenna tracking system which overcomes the above problems of the prior art by utilizing a single channel tracking system through which is passed a single error signal. The system eliminates all of the problems mentioned above and results in a highly reliable and far less expensive system. Briefly, the system uses an antenna having a double interleaved spiral with conductors suitably connected at the center, antennas of this type being well known in the art. Antennas of this type provide a single output signal which is a function of the difference in the output of the two antenna spirals at any given point in time, and therefore indicates total angular misalinement or off boresight angle between the neutral axis of the antenna and the direction of the RF source. Any other antenna which will provide such output could be used in place of the antenna described above. The antenna output is transferred to a self-organizing control system which is capable of operating with a single error input and of providing actuation control outputs to each of the actuators, individually, which are required for controlling antenna direction. The self-organizing control system utilizes a unified performance assessment function as fully disclosed in application, Ser. No. 565,162 of Roger L. Barron filed July 14, 1966, now U.S. Pat. No. 3,460,096 and shown particularly in FIG. 15 thereof. The self-organizing control system provides a plurality of actuator control output signals, one for each actuator to control the actuators and provide proper antenna positioning and tracking of a remote RF signal.

It is therefore an object of this invention to provide a self-programming antenna tracking system capable of operating with a single antenna error signal indication.

It is a further object of this invention to provide a self-programming antenna tracking system utilizing an antenna which provides a single error output signal and a self-organizing control system in combination therewith which is capable of multiple actuator control from the single error signal received from the antenna.

It is a further object of this invention to provide a self-programming antenna tracking system capable of receiving RF signals from remote sources to provide a positive semi-definite error signal indicative of the total angular difference in the signals received by the two antenna elements of the antenna.

It is a yet further object of this invention to provide a self-programming antenna tracking system of high reliability which is more economical to produce than comparable prior art systems.

The above objects and still further objects of the invention will immediately become apparent to those skilled in the art after consideration of the following preferred embodiment thereof which is provided by way of example and not by way of limitation wherein.

Figure 1:
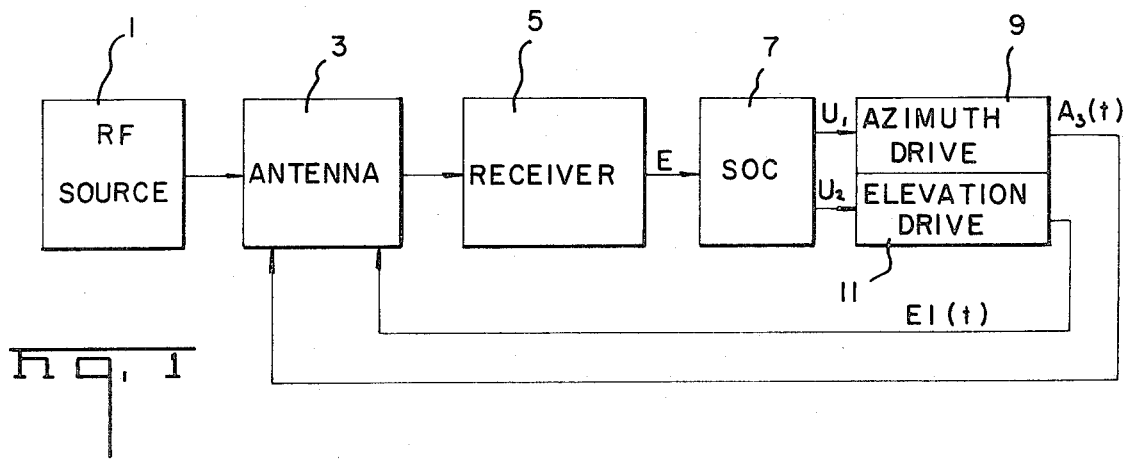
FIG. 1 is a block diagram of a self-programming antenna tracking system in accordance with the present invention.

Referring first to FIG. 1, there is shown a block diagram of the entire system in accordance with the present invention. The system includes a remote radio frequency source 1 which provides the signals to be tracked by the antenna tracking system. The tracking system includes an antenna 3 which is preferably a double spiral with conductors suitably connected at the center. It should be understood that any antenna which provides a single error signal at its output which is related to antenna total misalinement with the RF source can be used. The output of the antenna is transmitted to a receiver 5 wherein the signal can be amplified, if necessary, the receiver providing a positive, semi-definite error signal E. Only a single channel is required from the antenna 3 through the receiver 5 to the self-organizing controller 7 which operates on the error signal. The self-organizing controller 7 provides a plurality of output signals, one for each controlled element of the system. In the present embodiment, the antenna 3 is shown to have two degrees of freedom, one for azimuth and one for elevation. Therefore, the self-organizing controller 7 provides two actuator control output signals $U_1$ and $U_2$ to drive the azimuth drive 9 and the elevation drive 11 respectively. The azimuth drive 9 provides an azimuth output signal Az ($t$) to control the azimuth servo (not shown) of the antenna 3 and the elevation drive 11 provides an elevation output signal El ($t$) to drive the elevation servo (not shown) of the antenna 3. The azimuth drive and elevation drive elements can be controlled by the actuator control signals $U_1$ and $U_2$ or, alternatively, the $U_1$ and $U_2$ signals can be transmitted directly to the antenna 3 as the Az ($t$) and El ($t$) signals.

Figure 2:
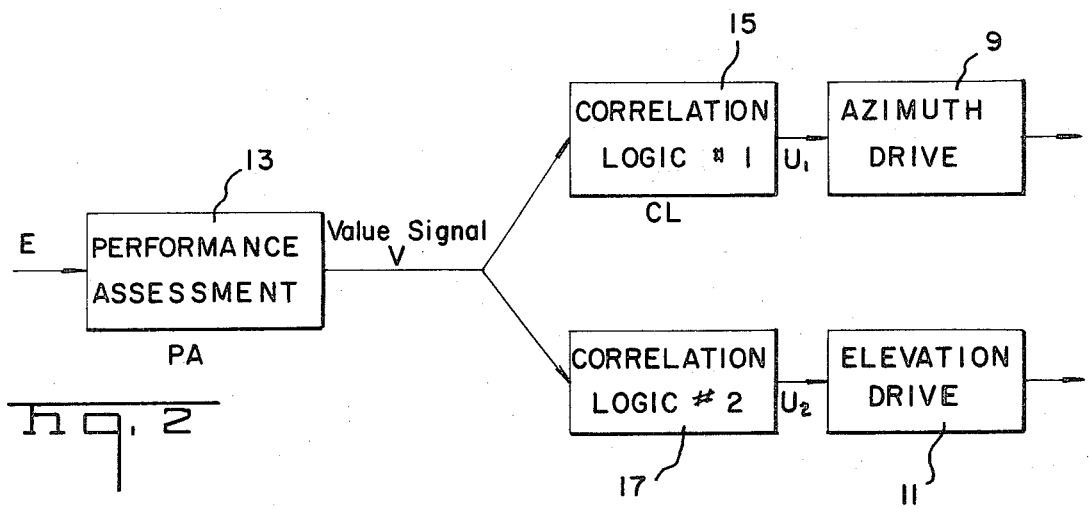
FIG. 2 is a block diagram of the self-organizing controller of FIG. 1.

Referring now to FIG. 2 there is shown a block diagram of the self-organizing controller 7 of FIG. 1. The controller has an input E thereto as shown in FIG. 1, the input being provided to a performance assessment device 13. The performance assessment device provides a single output value signal V indicative of performance assessment, the value signal being transmitted to correlation logic devices 15 and 17. It should be understood that two correlation logic devices are shown because the example herein includes merely two actuators. The number of correlation logic devices could be increased if additional actuators were in the system. The correlation logic devices each operate upon the value signal V to provide actuation control signals $U_1$ and $U_2$ to operate the azimuth drive 9 and elevation drive 11 as indicated hereinabove.

Figure 3:
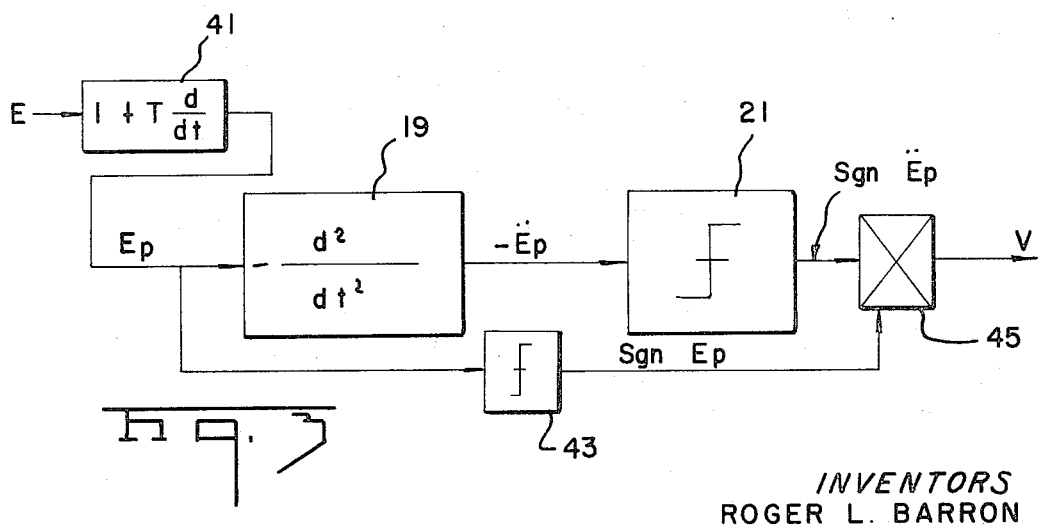
FIG. 3 is a block diagram of the performance assessment unit of FIG. 2.

Referring now to FIG. 3, there is shown a block diagram of the performance assessment device 13 in accordance with the present invention. The performance assessment device utilizes the error signal E at its input and operates thereon with the function (1+T $d/dt$) in block 41 to provide an output $E_p$. The negative value of the derivative of $E_p$ is provided by the double differentiator 19. The output of the double differentiator 19 is then passed to signum detector 21 wherein the polarity of the output of the differentiator 19 is assessed to provide a sign $\ddot{E}_p$ signal. The polarity of $E_p$ is also assessed by signum detector 43 to provide a sgn $E_p$ signal. The output of signum detectors 21 and 43 are then multiplied by multiplier 45, the output thereof being the value signal V. The performance assessment device therefore acts according to the formula V= −sgn $\ddot{E}_p$ Sgn $E_p$ in which $E_p$=E+T$\dot{E}$, T being a positive constant. In the present system, a V or value signal of plus 1 is indicative of a good experiment and a value signal of minus 1 is indicative of a poor experiment. These are the only two outputs available from the signum detector 21. Use of the predicted second derivative of the error signal is based upon the fact that it generally requires a longer time to observe results of antenna mechanical responses at the level of the first derivative of the error signal as compared with the predicted second derivative. It is therefore desirable to excite the drive units used for controlling the antenna in a way which is responsive to the predicted acceleration of the error.

Figure 4:
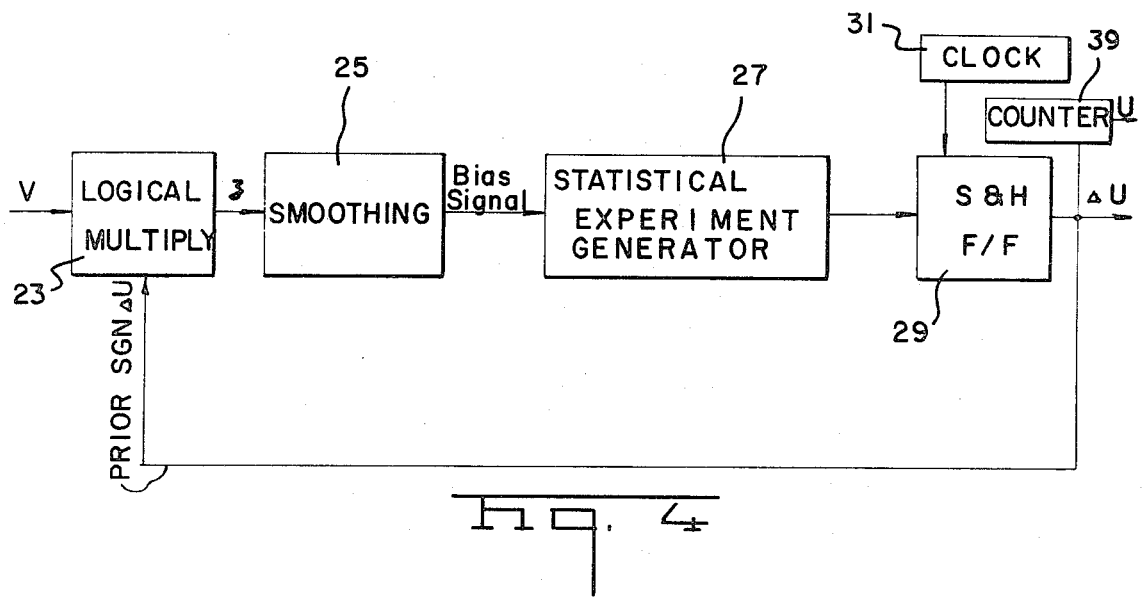
FIG. 4 is a block diagram of the correlation logic of FIG. 2.

Referring now to FIG. 4, there is shown a typical correlation logic circuit of the type shown in FIG. 2. The correlation logic circuit includes a multiplier 23 to which is fed a value signal V from the performance assessment device 13 and a feedback signal $\Delta U$ which is provided by the correlation logic, the derivation thereof being provided hereinbelow. The multiplier provides the function $V(t)\Delta U(t-\Delta t)$ at the end of a $\Delta t$ interval when multiplying the two input signals thereto and provides an output signal which is passed to a smoothing circuit 25 which has a time constant of approximately, but generally less than, $\Delta t$.

The smoothing circuit 25 is a lag filter used to integrate the output of the multiplier 23 during the terminal portion of each $\Delta t$ interval so as to provide a correlation between V and the delayed $\Delta U$ that is reasonably insensitive to effects of noise on the E signal, because such noise is capable of producing incorrect values of V.

The output of the smoothing circuit is a bias signal which is passed to a statistical experiment generator 27, the output of the smoothing device providing the bias signal therefore. The output of the statistical decision device 27 is either a plus 1 or minus 1 and is passed to a sample and hold flip flop 29 which is controlled by a clock 31. The clock 31 provides signals to the flip flop 29 every period $\Delta t$ to provide the $\Delta U$ output which is fed back to multiplier 23. The $\Delta U$ signals are summed to provide a staircase function which is the U output or actuator control signal. If the steps are the same size, the summing device can be a counter 39.

Figure 5:
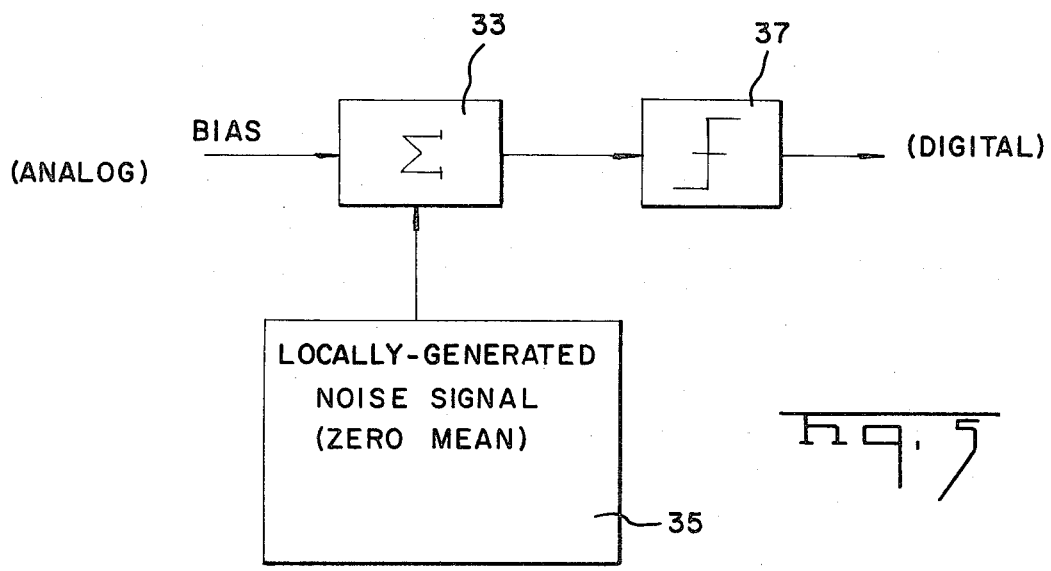
FIG. 5 is a block diagram of the statistical experiment generator of FIG. 4.

Referring now to FIG. 5, there is shown the statistical experiment generator 27 of FIG. 4. The statistical experiment generator has an input bias signal provided thereto from the smoothing device 25, the bias signal being of analog form. The bias signal is applied to an adder 33 to which is also applied noise from a noise source 35, the noise being locally generated and having zero mean. The output of the summation device 33 is then fed to a signum detector 37 which provides digital output signals indicative of the polarity of the detected output from the summation device 33. The digital output from the signum detector 37 is either a plus 1 or minus 1.

Referring now to the output of the multiplier 23, the output therefrom operates in accordance with the formula $Z = V \cdot \Delta U(t - \Delta t)$. Therefore, the output $z$ from the multiplier 23 would be plus 1 in the event a plus 1 is applied to both inputs thereto or a minus 1 is applied to both inputs thereto. The output $z$ would be minus 1 in the event the inputs to the multiplier 23 are of opposite polarity.

In operation, a remote RF source 1 will provide RF signals of predetermined frequency or in a predetermined frequency band which are radiated therefrom. These signals will be picked up by the antenna 3, the elements thereof providing a difference signal if the antenna elements thereof do not, individually, pick up the same amount of radiation. This difference in received signal by the antenna elements is provided at all times when the antenna is not directed exactly toward the RF source 1. After detection in the receiver, the antenna output, being a difference in received signal between the antenna elements, or a function related thereto, is therefore a positive semi-definite error signal and can be applied to the self-organizing controller 7. The self-organizing controller, for reasons more fully explained in the above identified copending application of Roger L. Barron, will operate with the error signal and provide actuator control output signals which adjust the position of the antenna directly on the RF source and also track the source in the event the source is not stationary. It can be seen that the system can perform all of the required functions by utilizing a single simple antenna system which provides a single error signal and requires only a single output channel.

As an alternative embodiment, the output of receiver 5 (FIG. 1) can be operated upon by a differentiator or an augmented differentiator or differentiators to provide an input or additional input, to the self-organizing controller 7, either separately or in summation with E. By way of illustration, in the region of minimum E, the sign of $\dot{E}$ changes when the antenna bore-sight crosses the RF source. The condition $\dot{E}=0$ is therefore indicative, but not uniquely, of the desired pointing of the antenna. However, in conjunction with other information, such as the value of E being small, such a condition may be made unique. It follows that one alternative embodiment uses the error function $E + K|\dot{E}|$ as the input to the performance assessment device 13 (FIG. 2).

Though the invention has been described with respect to a specific preferred embodiment thereof many variations and modifications thereof will immediately become apparent to those skilled in the art. It is therefore the intention that the appended claims be interpreted as broadly as possible in view of the prior art to include all such variations and modifications.

What is claimed is:

1. A self-programming antenna tracking system which comprises antenna means responsive to a remote RF source for providing a single output error signal indicative of misalinement of said antenna with said source, single channel control means responsive to said error signal for providing plural actuator control signals and plural actuators, each responsive to one of said actuator control signals for controlling the direction of said antenna.

2. A self-programming antenna tracking system according to claim 1 wherein said antenna is a double spiral with the conductors suitably connected at the center.

3. A self-programming antenna tracking system as set forth in claim 1 wherein said control means is a self-organizing control means.

4. A self-programming antenna tracking system as set forth in claim 2 wherein said control means is a self-organizing control means.

5. A self-programming antenna tracking system according to claim 3 wherein said self-organizing control means has a unified performance assessment device.

6. A self-programming antenna tracking system according to claim 4 wherein said self-organizing control means has a unified performance assessment device.

7. A self-programming antenna tracking system according to claim 3 wherein said self-organizing control means includes a single performance assessment device and plural correlation logic means responsive to said performance assessment device.

8. A self-programming antenna tracking system according to claim 4 wherein said self-organizing control means includes a single performance assessment device and plural correlation logic means responsive to said performance assessment device.

9. A self-programming antenna tracking system according to claim 7 wherein said actuators are each responsive to one of said correlation logic means.

10. A self-programming antenna tracking system according to claim 8 wherein said actuators are each responsive to one of said correlation logic means.

* * * * *